(12) United States Patent
Abdulaziz et al.

(10) Patent No.: US 12,372,349 B2
(45) Date of Patent: Jul. 29, 2025

(54) SURFACE ROUGHNESS MEASUREMENT SYSTEM (71) Applicant: EATON INTELLIGENT POWER LIMITED, Dublin (IE)

(72) Inventors: Salma Abdulaziz, Dun Laoghaire (IE); Keith Nolan, Mullingar (IE); Johannes Van De Belt, Ballsbridge (IE); James Ryle, Rathgar (IE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 199 days.

(21) Appl. No.: 18/260,715

(22) PCT Filed: Jan. 13, 2021

(86) PCT No.: PCT/EP2021/050589
§ 371 (c)(1),
(2) Date: Jul. 7, 2023

(87) PCT Pub. No.: WO2022/152374
PCT Pub. Date: Jul. 21, 2022

(65) Prior Publication Data
US 2024/0060773 A1 Feb. 22, 2024

(51) Int. Cl.
*G01B 11/30* (2006.01)
*G01B 11/22* (2006.01)
(Continued)

(52) U.S. Cl.
CPC ............ *G01B 11/303* (2013.01); *G01B 11/22* (2013.01); *G01N 35/00613* (2013.01);
(Continued)

(58) Field of Classification Search
CPC ....... G01B 11/303; G01B 11/22; G06T 7/521; G06T 7/0004; G06T 7/40;
(Continued)

(56) References Cited

U.S. PATENT DOCUMENTS 3,804,521 A * 4/1974 Sprague ................. G02B 27/48
356/600
2014/0055775 A1 2/2014 Imai et al.
(Continued)

OTHER PUBLICATIONS

Shijie Feng, et al., "Fringe pattern analysis using deep learning", arxiv.org, Cornell University Library, 201 Olin Library Cornell University Ithaca, NY 14853, Jul. 8, 2018 (Jul. 8, 2018), XP081112071, DOI: 10.1117/1.AP.1.2.025001; abstract; Introduction, Principle.

*Primary Examiner* — Jamil Ahmed
(74) *Attorney, Agent, or Firm* — LEYDIG, VOIT & MAYER, LTD.

(57) ABSTRACT

It is known for a product to be mass produced by way of a manufacturing process. Typically, a quality control step is used in a manufacturing process to monitor the quality of manufactured products. However, quality control procedures in manufacturing are typically labour intensive. A technician or other person must inspect the product and carry out any necessary tests. The present disclosure provides a surface roughness measurement system and method for determining a surface roughness of a product with an imaging system, a coherent light source, a light sensor and several trained machine learning algorithms.

20 Claims, 6 Drawing Sheets

(51) Int. Cl.
*G01N 35/00* (2006.01)
*G06T 7/00* (2017.01)
*G06T 7/40* (2017.01)
*G06T 7/521* (2017.01)

(52) U.S. Cl.
CPC .............. *G06T 7/0004* (2013.01); *G06T 7/40* (2013.01); *G06T 7/521* (2017.01); *G06T 2207/10048* (2013.01); *G06T 2207/20081* (2013.01); *G06T 2207/30108* (2013.01)

(58) Field of Classification Search
CPC . G06T 2207/10048; G06T 2207/20081; G06T 2207/30108; G01N 35/00613
See application file for complete search history.

(56) References Cited

U.S. PATENT DOCUMENTS

| | | |
|---|---|---|
| 2017/0262768 A1 | 9/2017 | Nowozin et al. |
| 2019/0287237 A1 | 9/2019 | De Bonfim Gripp et al. |
| 2019/0318469 A1 | 10/2019 | Wang |

* cited by examiner

SURFACE ROUGHNESS MEASUREMENT SYSTEM

FIELD OF THE DISCLOSURE

The present disclosure relates to a surface roughness measurement system and method and finds particular, although not exclusive, utility in an automated manufacturing quality control system and method.

BACKGROUND TO THE DISCLOSURE

It is known for a product to be mass produced by way of a manufacturing process. Raw materials or feedstock is taken and a series of manufacturing steps taken to produce a product. For example, carbon and silicon feedstock may be formed, via a series of manufacturing steps such as pressing, casting and finishing, into an automotive ceramic composite brake disc. The friction and wear characteristics of the brake disc are dependent on the surface finish of the brake disc. Therefore, the performance of the brake disc is dependent on the surface finish provided by the manufacturing process.

Typically, a quality control step is used in a manufacturing process to monitor the quality of manufactured products. Quality control steps may be included after each manufacturing step, or a single quality control step may be included after the final product has been manufactured. Furthermore, only a sample selection of manufactured products may be tested and an entire batch of products may be considered to have the properties of the tested selection. For example, every tenth brake disc produced may be subject to a quality control step. The surface finish of the brake disc may be inspected visually. Additionally, a roughness gauge may be used to directly measure the roughness of the brake disc surface. A product that is found to have an unacceptable surface roughness may be discarded or may be refinished, if possible.

However, quality control procedures in manufacturing are typically labour intensive. A technician or other person must inspect the product and carry out any necessary tests. Furthermore, the effectiveness of quality control procedures is dependent on the technician or other person undertaking the tests. Significant training and experience may be required to be able to accurately identify defects or other unwanted surface features. Furthermore, each person may have different opinions and therefore it is difficult to ensure a uniform quality control process is applied. Therefore, quality control procedures are typically time consuming, costly and may be subject to human judgement.

Therefore, it is desirable to provide a surface roughness measurement system and method that reduces the extent of the problems identified above. Objects and aspects of the present disclosure seek to provide such a system and method.

SUMMARY OF THE DISCLOSURE

According to a first aspect of the present disclosure, there is provided a surface roughness measurement system comprising: an imaging system configured to, in use, image a target surface; a coherent light source configured to, in use, illuminate the target surface; a light sensor configured to, in use, detect light from the coherent light source that is reflected by the target surface; and a processor configured and operable to: capture, with the imaging system, a first image depicting the target surface; generate, with a trained depth-perception machine learning model, a depth map corresponding to the first image; determine a maximum and a minimum depth of the first image based on the depth map; determine the maximum and minimum depths lie within a predetermined acceptable threshold range of depths; illuminate, with the coherent light source, the target surface; receive, from the light sensor, a waveform related to light reflected by the target surface; determine, with a trained material inspection machine learning model, a material of the target surface based on a wavelength or frequency of the waveform; illuminate, with the coherent light source, an area of interest of the target surface to create a speckle light pattern on the area of interest; capture, with the imaging system, a second image depicting the area of interest of the target surface; determine, with a trained surface roughness machine learning model, a value relating to a surface roughness of the area of interest based on the speckle light pattern and the material of the target surface.

A key advantage of the present disclosure is that a surface roughness measurement step, such as a manufacturing quality control step, may be automated in an accurate and reliable manner. Furthermore, the surface roughness measurement system may be used to measure the surface roughness of a range of materials without modification.

Surface roughness may mean the unevenness or irregularity of a surface. The roughness of a surface may be considered microscopically or macroscopically. The desired level of surface roughness of a product may be dependent on the intended use of the product. In some circumstances, a relatively low surface roughness may be desirable. For example, in a painting process such as an automotive body painting process, a relatively low surface roughness may be indicative of a higher quality paint finish and may therefore be desirable. In other circumstances, a relatively high surface roughness may be desirable. For example, an automotive brake disc may perform more effectively if a friction surface of the brake disc has a relatively high surface roughness.

The surface roughness measurement system may be used to measure a surface roughness of an object. The surface roughness measurement system may be used in a manufacturing quality control step. The imaging system and the coherent light source may be trained, in used, on the target surface.

The imaging system may comprise a plurality of imaging devices. For example, the imaging system may comprise two imaging devices, such as cameras. A first imaging device may be configured to capture the first image. A second imaging device may be configured to capture the second image. The first and second cameras may be configured to image light in the same or overlapping ranges of wavelengths or frequencies of light. In this way, a single coherent light source may be used. Alternatively, the first and second cameras may be configured to image light in discrete ranges of wavelengths or frequencies of light. In this way, the first camera may be able to image light that is not detectable by the second camera. In this example, the coherent light source may comprise two discrete light sources corresponding in wavelength and frequency with the first and second cameras.

The coherent light source may comprise an infrared laser and the imaging system may comprise an infrared camera. Alternatively, or additionally, the coherent light source may comprise a visible light laser and the imaging system may comprise a visible light camera. Other types of laser and camera are envisaged, such as ultraviolet lasers and cameras.

The waveform may comprise an electrical signal representing the energy of the light reflected or emitted by the target surface. Accordingly, the waveform may include a spectral fingerprint unique to the target surface material. The processor may be further configured to discretise and filter the waveform before applying the trained material inspection machine learning model. In this way, the trained material machine inspection may need only consider a relatively clean and manageable amount of information. The waveform may be digitized.

The processor may be further configured to store, in a data store, the material of the target surface following determination of the material. The data store may be local to the processor. Alternatively, the data store may be networked with the processor. The processor may be further configured to query the data store for the material type before applying the trained surface roughness machine learning model.

The predetermined acceptable threshold range of depths may include a measurement tolerance. The measurement tolerance may arise from the measurement method of the present disclosure. Accordingly, a product having a surface roughness outside of, but close to, the acceptable range of depths may not be identified as acceptable due to the measurement tolerance. Alternatively, the acceptable threshold range of depths may be chosen such that a product with an acceptable surface roughness is not discarded due to the tolerance of the measurement method. Products having a surface roughness close to an end point of the predetermined acceptable threshold range of depths may be analysed one or more times to ensure unacceptable products are correctly identified.

The light sensor may be an optoelectronic sensor. The light sensor may comprise optical elements such as lenses to collect and focus light, an optical element to diffract the light into separate wavelengths, and an optoelectronic detector. The optoelectronic detector may comprise a discrete array of photoelectric sensors from a photodiode in a 1×1 pixel array or a camera sensor in an N×M pixel array. The optoelectronic sensor may comprise a lens to collect and focus light, an optical element to diffract light into separate wavelengths, and an optoelectronic detector.

The intensity of the different wavelengths identified may provide a signature that allows for the surface material to be identified. For example, visible light reflected by a carbon surface may be separated into wavelengths having substantially equal, but relatively low, intensity.

The processor may be networked with at least one other processor of a surface roughness measurement system according to the first aspect of the disclosure. Accordingly, a plurality of surface roughness measurement systems may interact. Patterns and/or findings of one processor may therefore be shared with another processor. One or more identification steps may therefore be unnecessary and avoided.

The coherent light source may comprise a laser. The coherent light source may include a plurality of lasers. A first laser may be configured to illuminate the target surface and a second laser may be configured to illuminate the area of interest of the target surface. In this way, lasers having different wavelengths, frequencies and/or intensities may be used to illuminate the target surface for capturing the first and second images. Different lasers may be required for the first and second images to produce images that are useful in the subsequent analysis steps.

The trained depth-perception machine learning model may be trained with a labelled dataset including images and corresponding depth maps measured with a depth sensor. The depth sensor may comprise two or more light sensors and may calculate depth via triangulation processing. An accurate data set may therefore be used for training. In this way, the trained depth-perception machine learning model may be able to accurately determine depths from the first image.

The trained material inspection machine learning model may be trained with a labelled dataset including material surface types and corresponding waveforms of coherent light reflected by the material surface and collected by an optoelectronic sensor. The light source and/or optoelectronic sensor used to collect the dataset may be the light source and the optoelectronic sensor provided in the surface roughness measurement system. In this way, a reliable data set may be used for training. Furthermore, the trained material inspection machine learning model may be able to accurately determine the material of the surface.

The trained surface roughness machine learning model may be trained with a labelled dataset including speckle pattern images and measured surface roughness values. The light source and/or imaging system used to create the speckle pattern may be the light source provided in the surface roughness measurement system. In this way, a reliable data set may be used for training. Furthermore, the trained surface roughness machine learning model may be able to accurately determine a surface roughness value. The speckle pattern images may be captured by a plurality of co-located cameras. Contrast calculation and Doppler histogram may be performed and stored. Subsequently, the dataset may be hashed. The hashed contrast calculations and the hashed Doppler histogram may be appended and stored.

According to a second aspect of the present disclosure, there is provided a surface roughness measurement method comprising the steps: capturing, with an imaging system, a first image depicting a target surface; generating, with a trained depth-perception machine learning model, a depth map corresponding to the first image; determining a maximum and a minimum depth of the first image based on the depth map; determining the maximum and minimum depths lie within a predetermined acceptable threshold range of depths; illuminating, with a coherent light source, the target surface; receiving, from a light sensor, a waveform related to light reflected by the target surface; determining, with a trained material inspection machine learning model, a material of the target surface based on a wavelength or frequency of the waveform; illuminating, with the coherent light source, an area of interest of the target surface to create a speckle light pattern on the area of interest; capturing, with the imaging system, a second image depicting the area of interest of the target surface; determining, with a trained surface roughness machine learning model, a value relating to a surface roughness of the area of interest based on the speckle light pattern and the material of the target surface.

According to a third aspect of the present disclosure, there is provided a manufacturing quality control method comprising the steps of the method of the second aspect, wherein the target surface is a surface of a manufactured component and the manufactured component is rejected if: the maximum depth lies outside the predetermined acceptable threshold range of depths; the minimum depth lies outside the predetermined acceptable threshold range of depths; or the value relating to a surface roughness of the area of interest is outside of a predetermined range of acceptable values.

The second and/or the third aspects of the present disclosure may include any or each of the optional features described herein in relation to the first aspect of the present disclosure.

BRIEF DESCRIPTION OF THE DRAWINGS

The disclosure will now be described, by way of example only, with reference to the accompanying drawings, in which.

DETAILED DESCRIPTION

Figure 1:
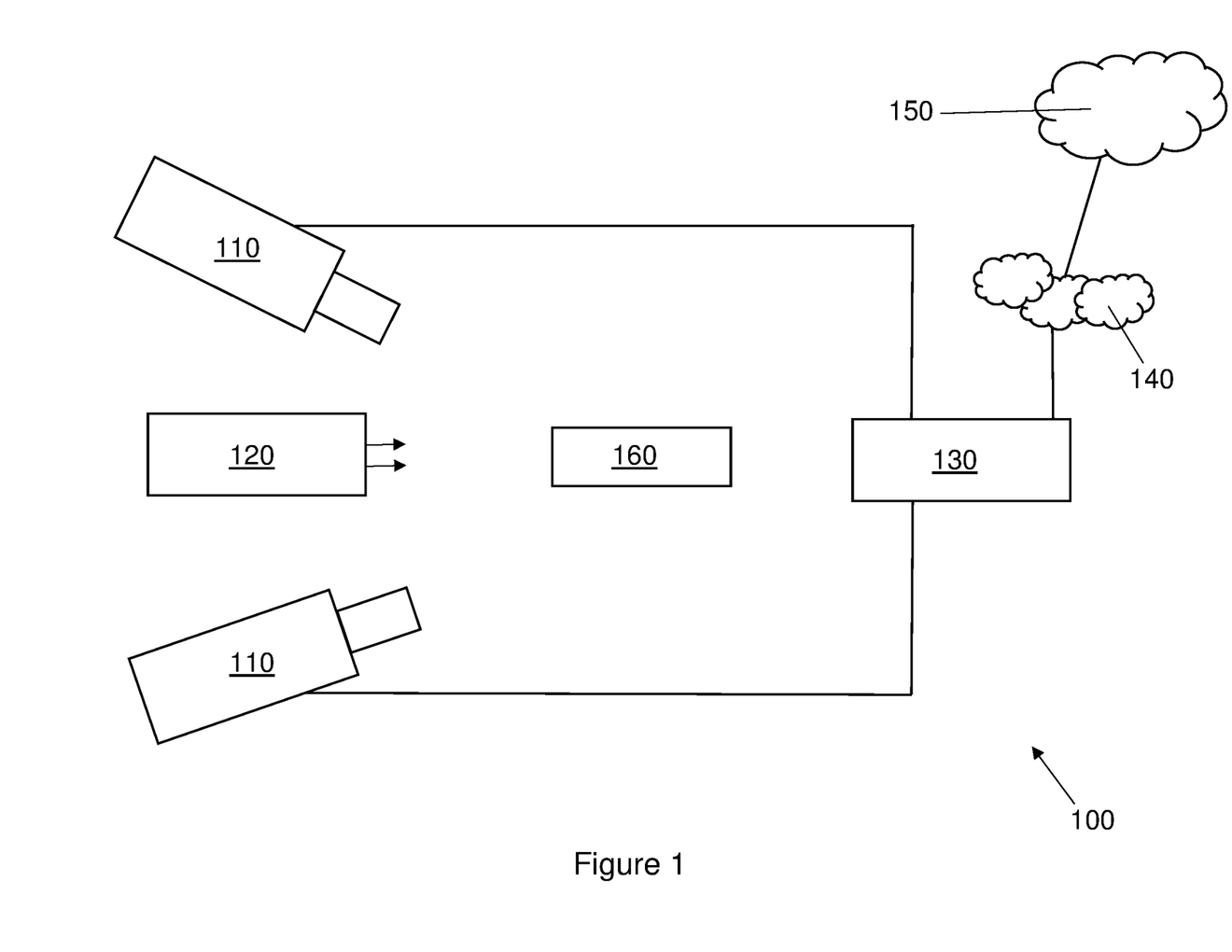
FIG. 1 is a schematic diagram of a surface roughness measurement system.

FIG. 1 is a schematic diagram of a surface roughness measurement system 100. The system 100 includes an imaging system, shown in FIG. 1 to include two cameras 110. Although cameras 110 are depicted, any suitable imaging device may be used. Furthermore, although two cameras 110 are depicted, the imaging system may alternatively include only a single imaging device or more than two imaging devices. The system 100 also includes a coherent light source 120. The imaging system and coherent light source 120 are chosen to be complimentary, such that the imaging system is able to image light within a range of wavelengths or frequencies that encompasses the wavelength or frequency of light emitted by the coherent light source 120. For example, the coherent light source 120 may comprise an infrared laser and the cameras 110 may be infrared cameras. Other wavelengths and frequencies of light are envisaged, such as visible light or ultraviolet light. The imaging system may include imaging devices configured to capture images in different wavelengths or frequencies of light. For example, a first camera 110 may be an infrared camera and a second camera 110 may be a visible light camera.

The system 100 also includes a processer 130, such as an edge processing unit, configured to control operation of the cameras 110 and the light source 120. The processor 130 may communicate with the cameras 110 and the light source 120 via a wired or wireless connection. For example only, FIG. 1 shows a wired connection between the processor 130 and the cameras 110, and a wireless connection between the processor 130 and the light source 120. The operation of the processor 130 is discussed in more detail with reference to FIGS. 2 and 3. The processor 130 is shown to be connected to a fog computing or cloudlet environment 140 and to an external cloud computing environment 150. Therefore, data collected by the sensor may be accessed and computed remotely. Other processing and data storage arrangements are envisaged. For example, all processing may occur locally at the processor 130, and the processor may include a memory for storage of data.

The cameras 110 and the light source 120 are trained on a target 160. The target 160 may be, for example, a product that has recently been manufactured and is being tested for quality control purposes. The target 160 may be any physical object.

Figure 2:
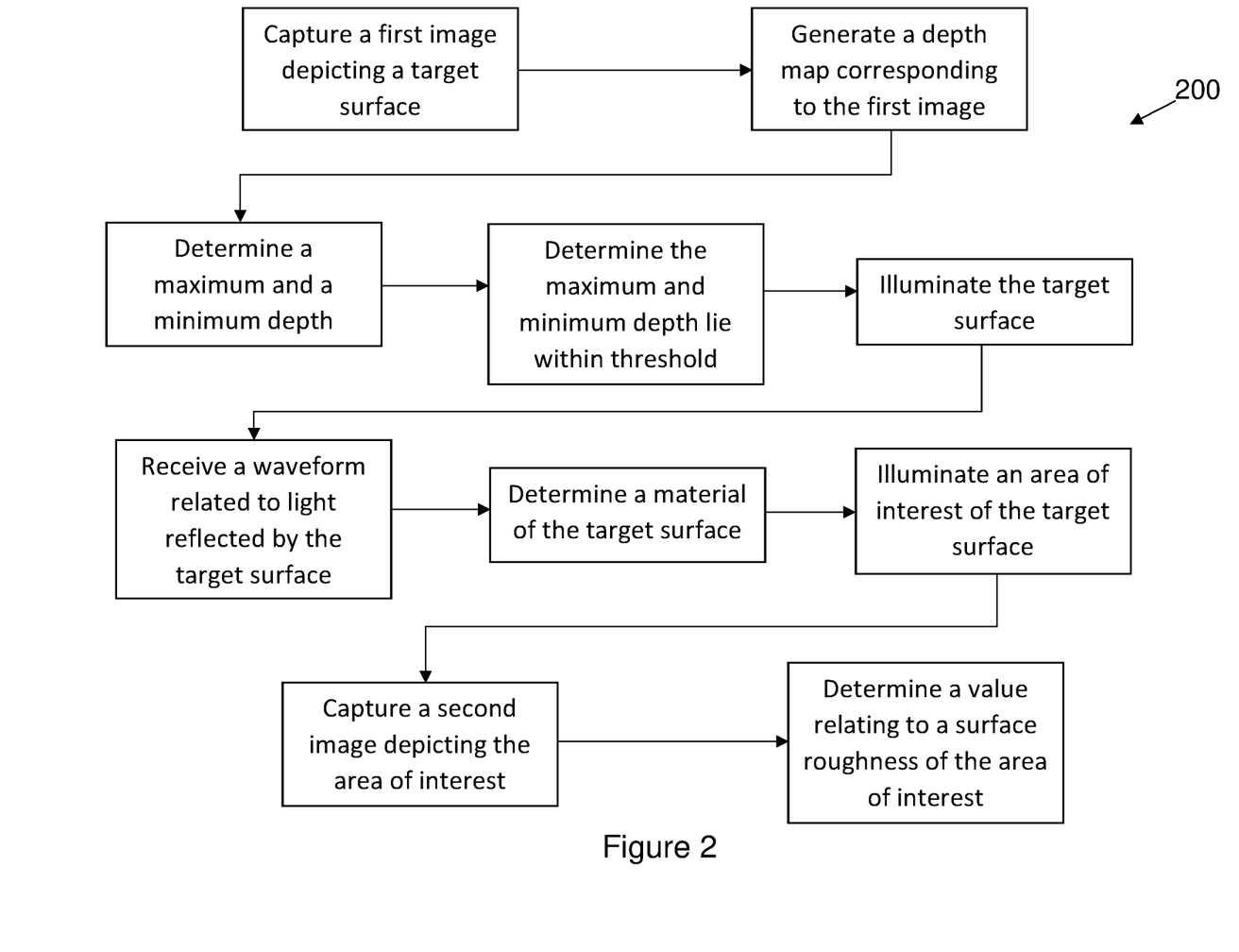
FIG. 2 is a method diagram showing the steps of a surface roughness measurement method.

FIG. 2 is a first method diagram showing the steps of a surface roughness measurement method 200. The method 200 may be carried out by the system 100 shown in FIG. 1. A first image depicting a target surface may be captured. A depth map corresponding to the first image may then be generated. The depth map contains information relating to the distance from the viewpoint of each sub portion of the target surface. Accordingly, a maximum and a minimum depth may be determined from the depth map. The maximum and minimum depths may then be analysed and a determination made as to whether or not the maximum and minimum depths lie within a predetermined acceptable threshold range of depths, which may take account of measurement tolerances. If the maximum and minimum depths do fall within the predetermined acceptable threshold, the target surface may be illuminated with a coherent light source. Light from the coherent light source will be reflected by the target surface and may then be received by a sensor, such as an optoelectronic sensor. The optoelectronic sensor may produce and provide a waveform in response to receiving the reflected light. The waveform received includes a signature unique to the surface material and may then be used, along with the known wavelength and frequency of the light emitted by the coherent light source, to determine a material of the target surface. Following the determination of the material of the target surface, an area of interest of the target surface may be illuminated with the coherent light source and imaged to capture a second image. The illumination of the area of interest of the target surface may create a speckle pattern on the surface which may be captured in the image. A value relating to a surface roughness of the area of interest may then be determined based on the surface material and the speckle pattern observed.

Figure 3:
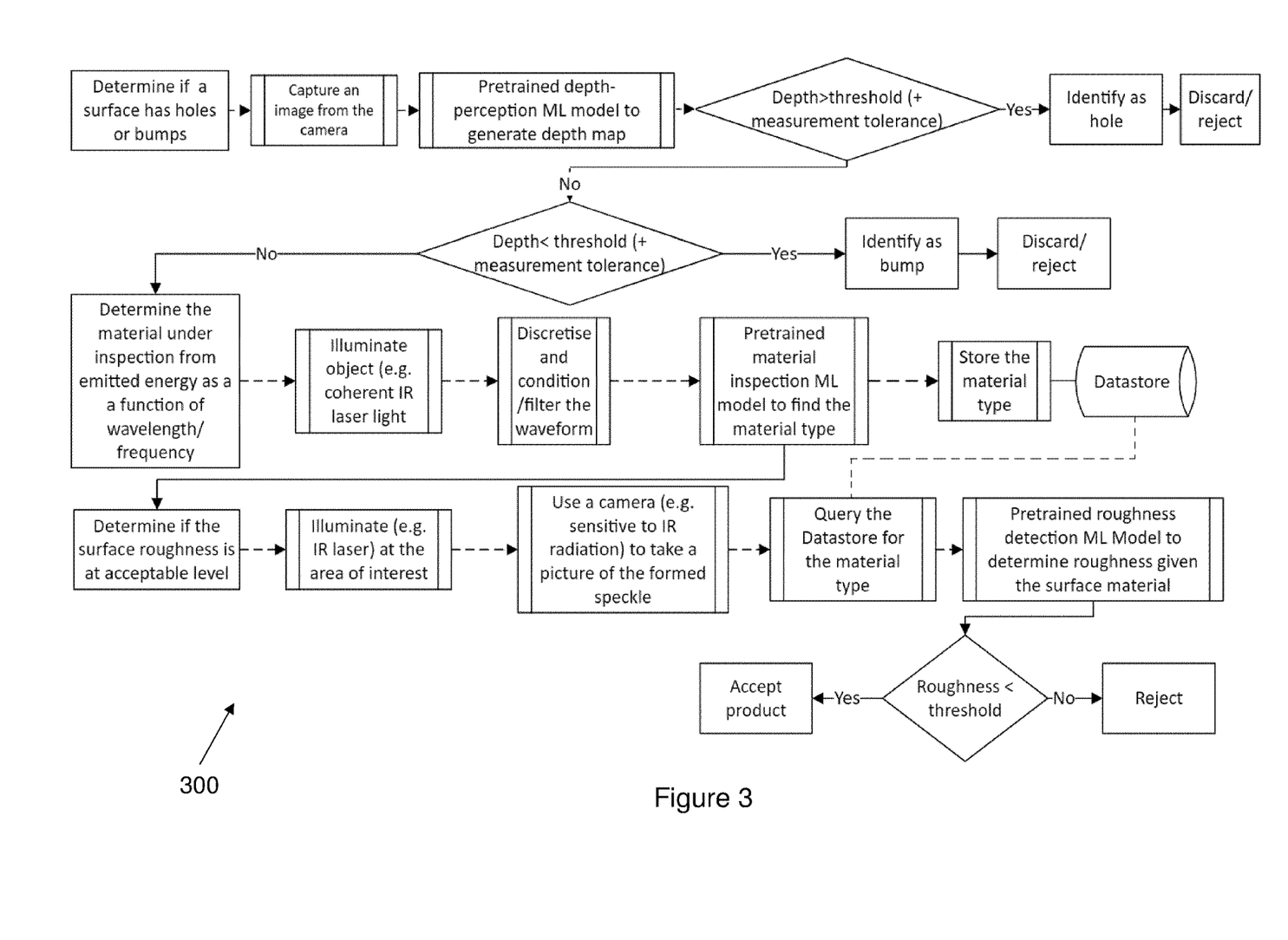
FIG. 3 is a method diagram showing the steps of a manufacturing quality control method.

FIG. 3 is a second method diagram showing the steps of a manufacturing quality control method 300. The method 300 may be carried out by the system 100 shown in FIG. 1. The first step of the method 300 is to determine if a target surface or a product has holes or bumps. A camera is used to capture an image of the target surface. A trained depth-perception machine learning model is then used to generate a depth map from the image of the target surface. The training of the depth-perception machine learning model is discussed with reference to FIG. 4. The depth data contained in the depth map may then be analysed and compared to a predetermined acceptable depth threshold. The predetermined acceptable depth threshold is chosen to take account of measurement tolerances such that unacceptable depths are not accepted due to a measurement tolerance. If the depth is greater than the threshold, a hole is identified and the product is discarded or rejected. If the depth is less than the threshold, a bump is identified and the product is discarded or rejected. Discarded or rejected products may be refinished or otherwise altered such that they may then pass the quality control test.

Once a product has passed the depth-perception step, a material of the target surface of the product is identified. First, the target surface of the object is illuminated with the coherent light source, such as an infrared laser, and the light is reflected by the target surface. An optoelectronic sensor receives the reflected light and generates a signal waveform including a light reflection signature unique to the target surface material. The signal waveform may then be discretised and filtered before being passed to a trained material inspection machine learning model. The training of the material inspection machine learning model is discussed with reference to FIG. 5. Once the material type has been identified, the material type may be stored in a data store.

After the material type has been identified, the roughness of the target surface may be analysed. An area of interest of the target surface may be illuminated with a coherent light source, such as an infrared laser, and a camera, such as an infrared camera, may be used to image the area of interest. The surface, when illuminated, will create a speckle light pattern that is dependent on the roughness of the surface. The speckle pattern will be visible in the image of the area of interest. The material type may be retrieved from the data store and provided, along with the image of the area of interest showing the speckle pattern, to a trained roughness detection machine learning model which may determine a roughness of the surface material. The training of the roughness detection machine learning model is discussed with reference to FIG. 6. The identified surface roughness may then be compared to a predetermined acceptable threshold value for surface roughness. If the surface roughness is less than the threshold value, the product may pass the quality control test. If the surface roughness is greater than the threshold, the product may fail the quality control test.

Figure 4:
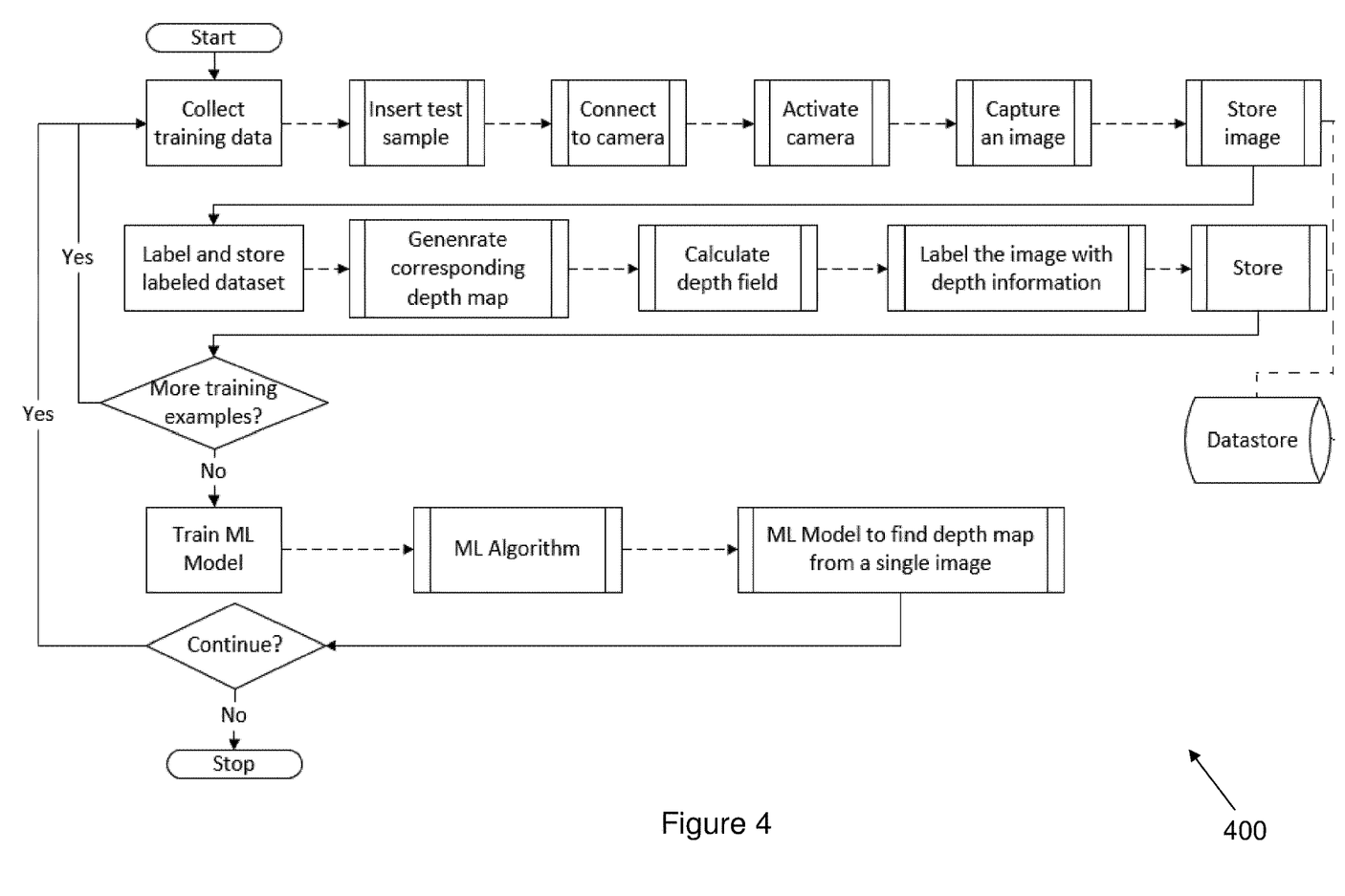
FIG. 4 is a method diagram showing the steps of a training method for calculating a depth map from a single image.

FIG. 4 is a third method diagram showing the steps of a training method 400 for calculating a depth map from a single image. The training method 400 generally includes three steps, each including several sub steps. The first step is to collect training data. Depth perception test apparatus may be provided to collect training data. The test apparatus may comprise the system shown in FIG. 1 along with a depth sensor. A test sample is provided for imaging with the test apparatus. A controller, such as a computer processor, may then connect to a camera and activate the camera to capture an image of the test sample. The image of the test sample may then be stored in a data store. The second step is to label and store a labelled dataset. A depth map corresponding to the image of the test sample is generated, for example with a depth sensor. Once the depth map has been generated, a depth field may be calculated. Accordingly, an image of the test sample and a corresponding depth field may be obtained. The image may be labelled with the depth information and stored in the data store.

If further training examples are required to provide a sufficient number of training examples, the first and second steps may be repeated with other test samples. If a sufficient number of training examples has been obtained, the final step is to train a depth-perception machine learning model. The machine learning algorithm is specified and then trained with the training dataset created previously. The trained machine learning algorithm may then be tested and verified. The trained machine learning model may be presented with a single image and may determine a depth map corresponding to the image. A depth map corresponding to the image may be measured independently and compared to the depth map determined by the trained machine learning algorithm. If the trained machine learning algorithm is able to accurately determine a depth map from a single image, the method 400 ends. However, if the trained machine learning algorithm is not able to determine a depth map from a single image with an acceptable accuracy, each of the three steps of the method 400 may be repeated to increase the size of the training data set and retrain the machine learning model.

Figure 5:
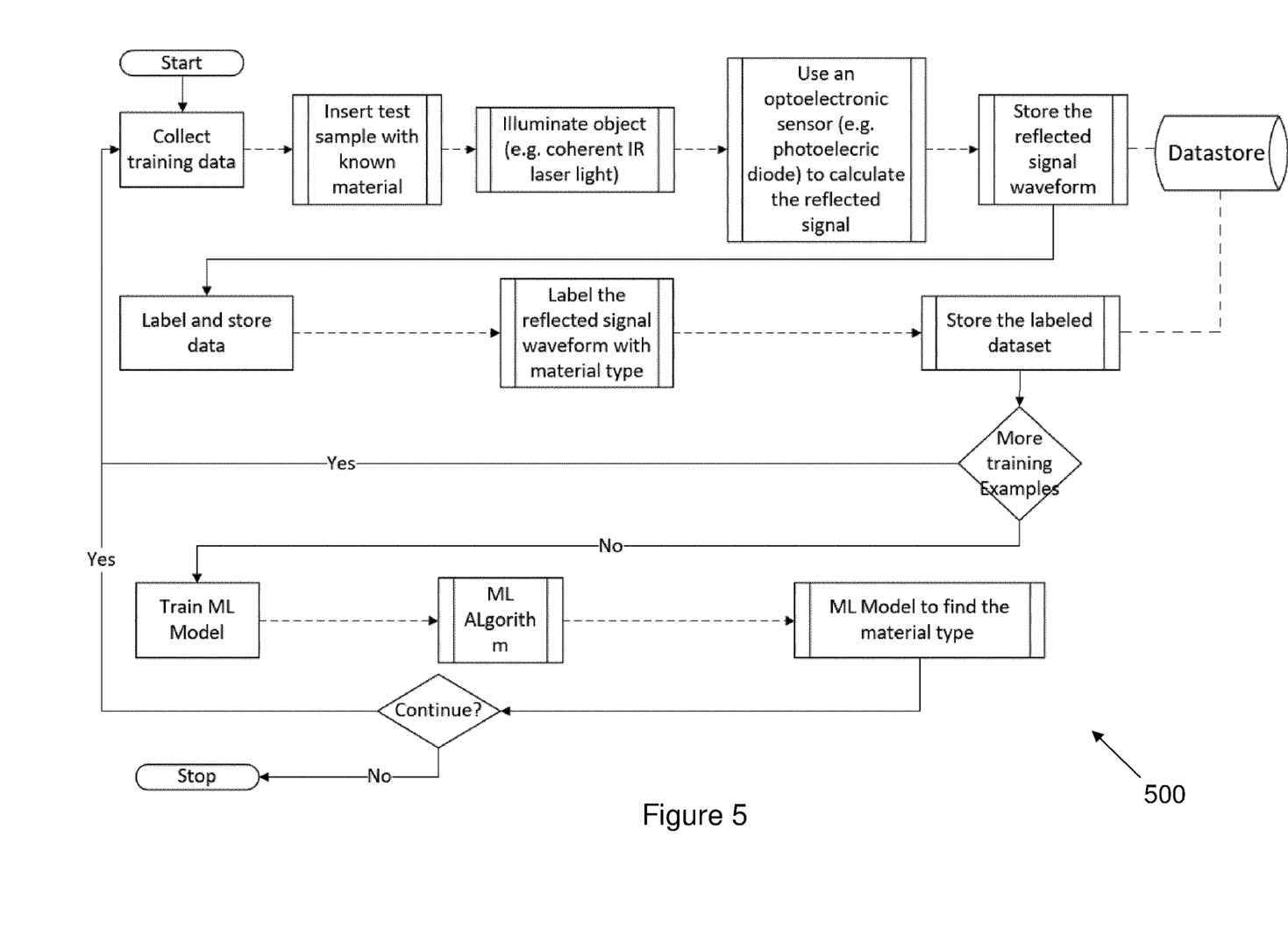
FIG. 5 is a method diagram showing the steps of a training method for material inspection using reflected signals.

FIG. 5 is a fourth method diagram showing the steps of a training method 500 for material inspection using reflected signals. The training method 500 generally includes three steps, each including several sub steps. The first step is to collect training data. Material inspection test apparatus may be provided to collect training data. The test apparatus may comprise the system shown in FIG. 1. A test sample having a known surface material is provided and tested with the test apparatus. A controller, such as a computer processor, may control a coherent infrared laser light source to illuminate the test sample. Light will be reflected by the test sample and may be captured by an optoelectronic sensor, such as a photoelectric diode. The optoelectronic sensor may calculate a signal waveform corresponding to the reflected light signal. The signal waveform may then be stored in a data store. The second step is to label and store a labelled dataset. The signal waveform calculated may be labelled with the known surface material and stored in the data store.

If further training examples are required to provide a sufficient number of training examples, the first and second steps may be repeated with other test samples. If a sufficient number of training examples has been obtained, the final step is to train a material inspection machine learning model. The machine learning algorithm is specified and then trained with the training dataset created previously. The trained machine learning algorithm may then be tested and verified. The trained machine learning model may be presented with a signal waveform captured by the optoelectronic sensor and may determine a surface material corresponding to the signal waveform. The known surface material may then be compared to the material determined by the trained machine learning algorithm. If the trained machine learning algorithm is able to accurately determine a material from a signal waveform, the method 500 ends. However, if the trained machine learning algorithm is not able to determine a material from a signal waveform with an acceptable accuracy, each of the three steps of the method 500 may be repeated to increase the size of the training data set and retrain the machine learning model.

Figure 6:
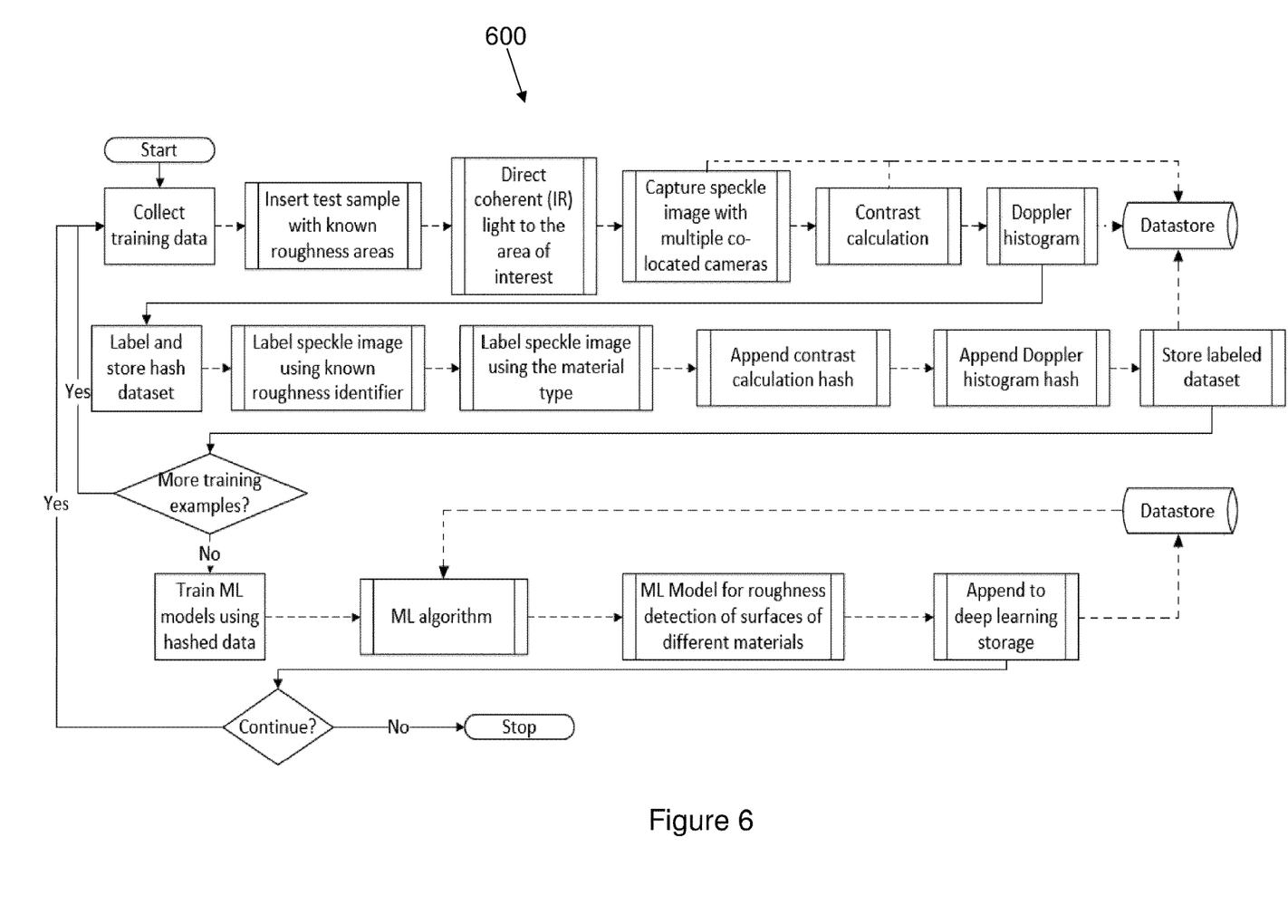
FIG. 6 is a method diagram showing the steps of a training method for roughness measurement using speckle images.

FIG. 6 is a fifth method diagram showing the steps of a training method 600 for roughness measurement using speckle images. The training method 600 generally includes three steps, each including several sub steps. The first step is to collect training data. Surface roughness test apparatus may be provided to collect training data. The test apparatus may comprise the system shown in FIG. 1 along with a surface roughness gauge. A test sample having known surface roughness is provided and tested with the test apparatus. The surface roughness gauge may be used to determine a surface roughness of the test sample. A controller, such as a computer processor, may control a coherent infrared laser light source to illuminate an area of interest of the test sample. The surface roughness will cause a speckle light pattern to form on the target surface. Co-located cameras may then be used to image the speckle pattern. Contrast calculation and Doppler histogram may then be performed and stored, along with the speckle pattern image, in a data store.

The second step is to label and store a hash dataset. The speckle image is labelled with the known roughness level, as measured with the surface roughness gauge, and a material type for the target surface. A contrast calculation hash and Doppler histogram hash are also appended to the speckle image. The labelled data may then be stored in the data store.

If further training examples are required to provide a sufficient number of training examples, the first and second steps may be repeated with other test samples. If a sufficient number of training examples has been obtained, the final step is to train a surface roughness machine learning model. The machine learning algorithm is specified and then trained with the training dataset created previously. The trained machine learning algorithm may then be tested and verified. The trained machine learning model may be presented with a speckle pattern and material type and may determine a corresponding surface roughness. The surface roughness as measured with the roughness gauge may then be compared to the surface roughness determined by the trained machine learning algorithm. If the trained machine learning algorithm is able to accurately determine a surface roughness, the trained machine learning algorithm is appended to deep learning storage and the method 600 ends. However, if the trained machine learning algorithm is not able to determine a surface roughness with an acceptable accuracy, each of the three steps of the method 600 may be repeated to increase the size of the training data set and retrain the machine learning model.

Although FIG. 1 depicts two cameras, any other suitable imaging system or device may be provided to capture images of the target. Furthermore, although an infrared laser is described herein, any coherent light source may be used to illuminate a target surface. In addition, any number of imaging devices and light sources may be provided. Cloudlet and cloud computing is described with reference to FIG. 1. However, other suitable computing environments, such as an entirely local computing environment, are envisaged. Additionally, any or each of the methods described with reference to FIGS. 2 to 6 may include additional steps, as is clear from the present disclosure. Some of the specific method steps described with reference to FIGS. 3 to 6 may not be necessary and are provided for descriptive purposed only. For example, the training method for roughness measurement using speckle images shown in FIG. 6 may be usable without calculating one or both of the contrast calculation and the Doppler histogram. Furthermore, the method described with reference to FIG. 3 specifies rejecting a product if the roughness is above a threshold value. However, the product being produced may require a rough surface, and the product may be rejected if the roughness is below a threshold value. Other method steps disclosed herein may also be optional.

The invention claimed is:

1. A surface roughness measurement system comprising:
an imaging system configured to, in use, image a target surface;
a coherent light source configured to, in use, illuminate the target surface;
a light sensor configured to, in use, detect light from the coherent light source that is reflected by the target surface; and
a processor configured and operable to:
capture, with the imaging system, a first image depicting the target surface;
generate, with a trained depth-perception machine learning model, a depth map corresponding to the first image;
determine a maximum and a minimum depth of the first image based on the depth map;
determine the maximum and minimum depths lie within a predetermined acceptable threshold range of depths;
illuminate, with the coherent light source, the target surface;
receive, from the light sensor, a waveform related to light reflected by the target surface;
determine, with a trained material inspection machine learning model, a material of the target surface based on a wavelength or frequency of the waveform;
illuminate, with the coherent light source, an area of interest of the target surface to create a speckle light pattern on the area of interest;
capture, with the imaging system, a second image depicting the area of interest of the target surface;
determine, with a trained surface roughness machine learning model, a value relating to a surface roughness of the area of interest based on the speckle light pattern and the material of the target surface.

2. The surface roughness measurement system of claim 1, wherein the imaging system comprises a plurality of imaging devices.

3. The surface roughness measurement system of claim 2, wherein a first imaging device is configured to capture the first image and a second imaging device is configured to capture the second image.

4. The surface roughness measurement system of claim 1, wherein the coherent light source comprises an infrared laser and the imaging system comprises an infrared camera.

5. The surface roughness measurement system of claim 1, wherein the processor is further configured to discretise and filter the waveform before applying the trained material inspection machine learning model.

6. The surface roughness measurement system of claim 1, wherein the processor is further configured to store, in a data store, the material of the target surface following determination of the material.

7. The surface roughness measurement system of claim 6, wherein the processor is further configured to query the data store for the material type before applying the trained surface roughness machine learning model.

8. The surface roughness measurement system of claim 1, wherein the predetermined acceptable threshold range of depths includes a measurement tolerance.

9. The surface roughness measurement system of claim 1, wherein the light sensor is an optoelectronic sensor.

10. The surface roughness measurement system of claim 9, wherein the optoelectronic sensor comprises a lens to collect and focus light, an optical element to diffract light into separate wavelengths, and an optoelectronic detector.

11. The surface roughness measurement system of claim 1, wherein the processor is networked with at least one other processor of a surface roughness measurement system according to claim 1.

12. The surface roughness measurement system of claim 1, wherein the coherent light source includes a plurality of lasers.

13. The surface roughness measurement system of claim 12, wherein a first laser is configured to illuminate the target surface and a second laser is configured to illuminate the area of interest of the target surface.

14. The surface roughness measurement system of claim 1, wherein the trained depth-perception machine learning model is trained with a labelled dataset including images and corresponding depth maps measured with a depth sensor.

15. The surface roughness measurement system of claim 1, wherein the trained material inspection machine learning model is trained with a labelled dataset including material surface types and corresponding waveforms of coherent light reflected by the material surface and collected by an optoelectronic sensor.

16. The surface roughness measurement system of claim 1, wherein the trained surface roughness machine learning model is trained with a labelled dataset including speckle pattern images and measured surface roughness values.

17. The surface roughness measurement system of claim 16, wherein the speckle pattern images are captured by a plurality of co-located cameras.

18. The surface roughness measurement system of claim 17, wherein contrast calculation and Doppler histogram are performed and stored, the dataset is hashed, and the hashed contrast calculations and the hashed Doppler histogram are appended and stored.

19. A surface roughness measurement method comprising the steps:
- capturing, with an imaging system, a first image depicting a target surface;
- generating, with a trained depth-perception machine learning model, a depth map corresponding to the first image;
- determining a maximum and a minimum depth of the first image based on the depth map;
- determining the maximum and minimum depths lie within a predetermined acceptable threshold range of depths;
- illuminating, with a coherent light source, the target surface;
- receiving, from a light sensor, a waveform related to light reflected by the target surface;
- determining, with a trained material inspection machine learning model, a material of the target surface based on a wavelength or frequency of the waveform;
- illuminating, with the coherent light source, an area of interest of the target surface to create a speckle light pattern on the area of interest;
- capturing, with the imaging system, a second image depicting the area of interest of the target surface;
- determining, with a trained surface roughness machine learning model, a value relating to a surface roughness of the area of interest based on the speckle light pattern and the material of the target surface.

20. A manufacturing quality control method comprising the steps of the method of claim 19, wherein the target surface is a surface of a manufactured component and the manufactured component is rejected if:
- the maximum depth lies outside the predetermined acceptable threshold range of depths;
- the minimum depth lies outside the predetermined acceptable threshold range of depths; or
- the value relating to a surface roughness of the area of interest is outside of a predetermined range of acceptable values.

* * * * *